Aug. 7, 1956 W. G. FASTIE 2,757,568
MONOCHROMATOR SYSTEM FOR SPECTROCHEMICAL ANALYSIS
Filed Aug. 10, 1951 7 Sheets-Sheet 4

*INVENTOR.*
WILLIAM G. FASTIE
BY
ATTORNEYS

Aug. 7, 1956 W. G. FASTIE 2,757,568
MONOCHROMATOR SYSTEM FOR SPECTROCHEMICAL ANALYSIS
Filed Aug. 10, 1951 7 Sheets-Sheet 5

*INVENTOR.*
WILLIAM G. FASTIE
BY
Woodcock and Phelan
ATTORNEYS

Aug. 7, 1956 — W. G. FASTIE — 2,757,568
MONOCHROMATOR SYSTEM FOR SPECTROCHEMICAL ANALYSIS
Filed Aug. 10, 1951 — 7 Sheets-Sheet 6

Fig.7

INVENTOR.
WILLIAM G. FASTIE
BY
Woodcock and Phelan
ATTORNEYS

Aug. 7, 1956 W. G. FASTIE 2,757,568
MONOCHROMATOR SYSTEM FOR SPECTROCHEMICAL ANALYSIS
Filed Aug. 10, 1951 7 Sheets-Sheet 7

INVENTOR.
WILLIAM G. FASTIE
BY
Woodcock and Phelan
ATTORNEYS

United States Patent Office 2,757,568
Patented Aug. 7, 1956

2,757,568

MONOCHROMATOR SYSTEM FOR
SPECTROCHEMICAL ANALYSIS

William G. Fastie, Owings Mills, Md., assignor to Leeds
and Northrup Company, Philadelphia, Pa., a corporation of Pennsylvania Application August 10, 1951, Serial No. 241,194

8 Claims. (Cl. 88—14)

This invention relates to spectroscopy and has for an object the provision of a new and improved system for a monochromator useful for spectrochemical analysis. More particularly, it is an object of the invention to provide a monochromator having an optical system which, except for astigmatism, is free from off-axis aberrations and which greatly simplifies the mounting and substantially eliminates any need for adjustment of the reflecting surfaces forming a part thereof.

Another object of the invention is the provision of actuating mechanism for intermittently rotating a dispersing element of the optical system to predetermined positions for selection of various lines of the spectrum to be projected upon the exit slit of the monochromator which may include a cycle scanning entrance slit for slowly moving each of the selected lines with respect to the exit slit to provide for scanning of the peak intensities of the selected lines.

Various features of the present invention are applicable to the spectral systems of such instruments as the spectroscope, spectrometer, spectrograph, spectrophotometer, and the like, as will be understood after a detailed description of the features as applied to a monochromator, a device for isolating or viewing monochromatic energy, such as an emission line or a narrow band of continuous spectrum of radiant energy, from a light source. Elements comprising a monochromator are generally included as a part of each of the foregoing types of instruments.

In carrying out the present invention in one form thereof, a concave spherical mirror is supported in a cup-like flanged housing rigidly secured to a flange of a relatively heavy tubular structure with the axis of the mirror coincident with the longitudinal axis of the tube. A spectral dispersing means such as a plane reflection grating is supported within the tube in a position facing the mirror and such that the center of the dispersing element is intercepted by the longitudinal axis of the tube. This arrangement provides a structure wherein two areas of the mirror are symmetrically disposed with respect to said axis to provide optical paths to the grating from focal points of the mirror symmetrically laterally displaced from the longitudinal axis of the tube.

By utilizing two reflecting areas of the same spherical mirror, assurance is not only had of identical optical characteristics, but also there is avoided the need of time-consuming adjustments which would be incident to the use of separate mirrors, and there is achieved a simplicity and ruggedness of construction which is free from vibration and assures that the monochromator will remain in adjustment.

By utilizing two symmetrical areas of the spherical mirror, the optical system is corrected for and is free from off-axis aberrations, except for astigmatism which is not bothersome because the object is a slit, as will be later explained.

In accordance with another aspect of the invention, the spectral dispersing means or grating may be pivotally mounted as by a crank shaft type of mounting for rotation about an axis perpendicular to the axis of the spherical mirror and so that ruled lines of the grating are perpendicular to the plane which passes through the midpoint to the entrance and exit slits, this plane containing the optical axis of the mirror. By providing a crank arm for the grating and an intermittently operated mechanism associated therewith, such as a stepping turret having a multiplicity of stops which may one at a time be located to position the arm, the grating may successively be positioned for projecting various selected lines of the spectrum upon the exit slit of the monochromator. Additionally, by providing a cyclic scanning entrance slit synchronized with the stepping turret as by cam means driven from a rotatable shaft, the latter having another cam thereon for moving the grating arm relative to the stepping turret intermediate the successive scanning operations, the various selected spectral lines may be scanned for their peak intensities.

For a more detailed disclosure of the invention and for further objects and advantages thereof, reference is to be had to the following description taken in conjunction with the following drawings in which.

Figure 1:
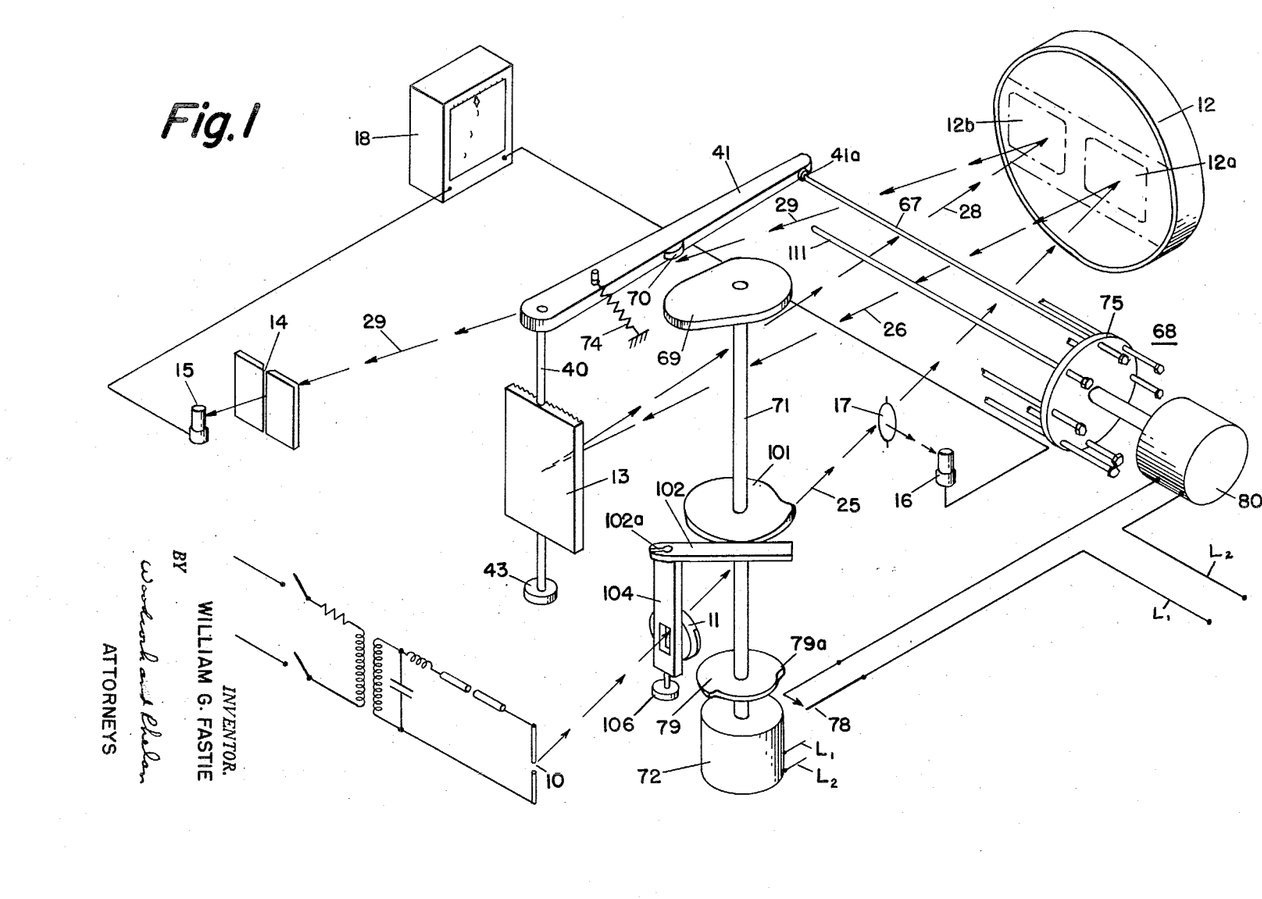
Fig. 1 diagrammatically illustrates in perspective a system for direct reading spectrochemical analysis embodying the cyclic scanning entrance slit and the stepping turret of the present invention.
Figure 2:
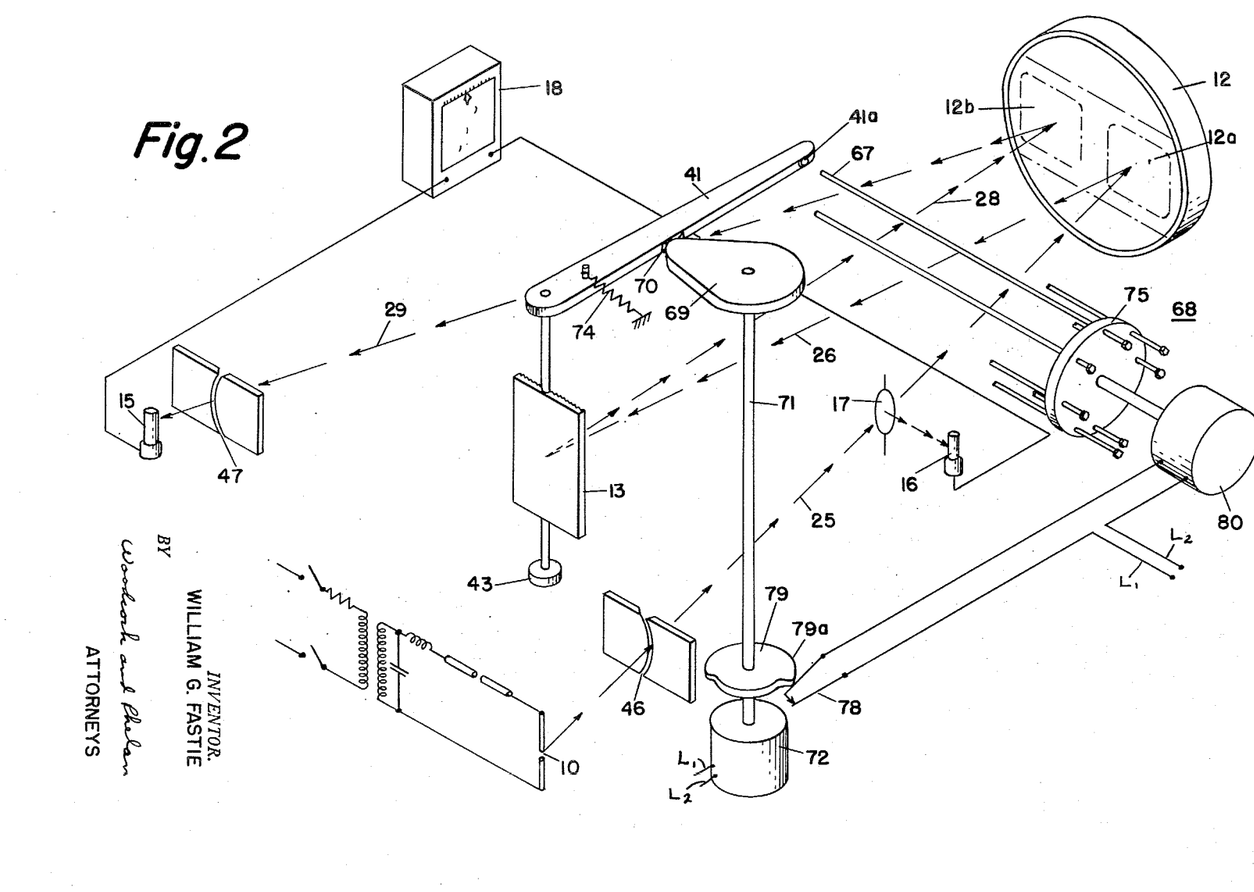
Fig. 2 diagrammatically illustrates in perspective a modification of the system for direct reading spectrochemical analysis shown in Fig. 1 embodying a similar optical system and including curved entrance and exit slit structure.
Figure 3:
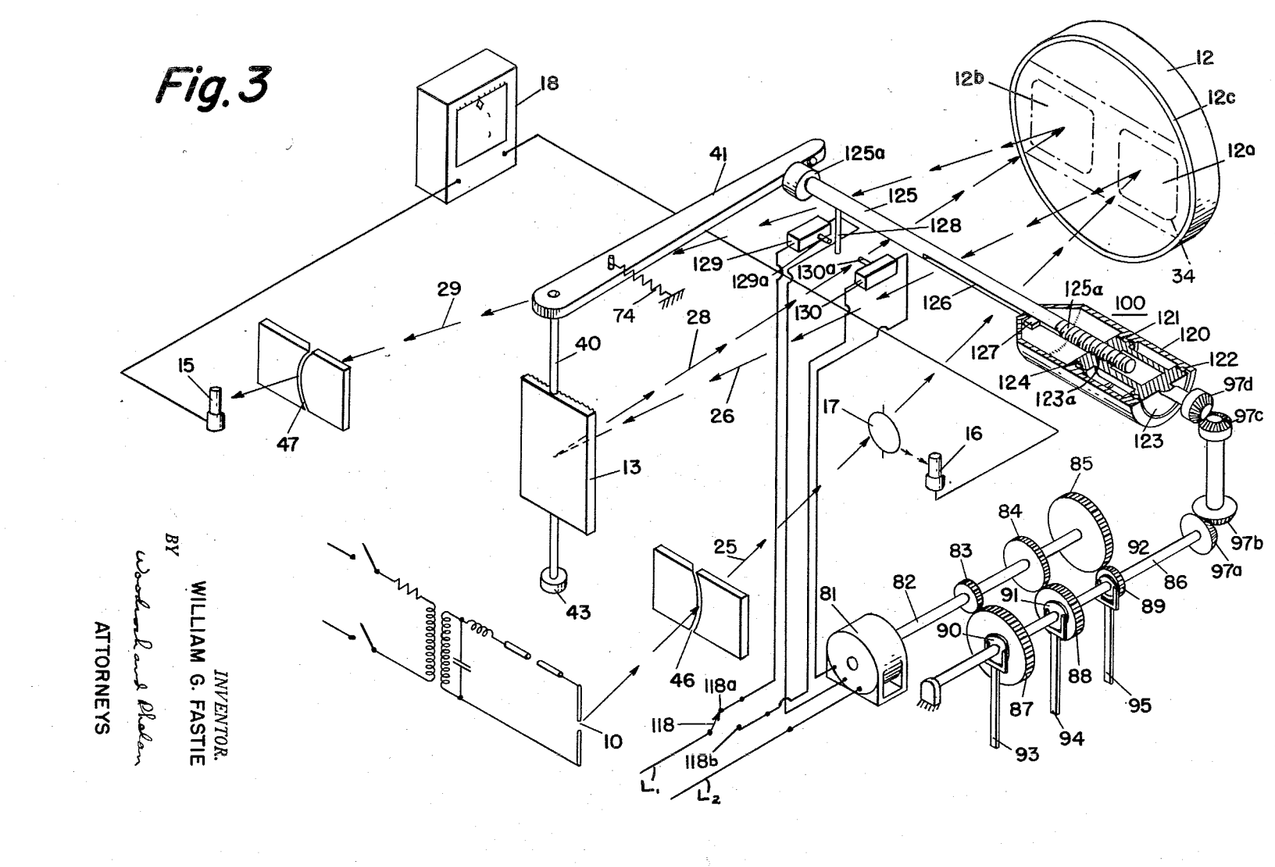
Fig. 3 diagrammatically illustrates in perspective a modification of the system of Fig. 2 for direct reading spectrochemical analysis including continuous scanning.

Referring to the drawings there is shown diagrammatically in Figs. 1–3 spectrometer systems for direct reading spectrochemical analysis of emission spectra utilizing a ratio method of measurement. Radiant energy is produced by a spark or arc created in a gap between a pair of electrodes made of a material to be analyzed. The monochromator system illustrated includes various features of the present invention. Each of the spectrometer systems is provided with a single stationary photosensitive element, for example, a photomultiplier tube for receiving the radiant energy emanating from the selected line or band of the spectrum. The shifting from one line or band of the spectrum to another may be accomplished by rotating the dispersing means either to predetermined fixed positions as shown in Figs. 1 and 2 by a step-by-step procedure or by continuous rotation of the dispersing means through a predetermined angle of revolution as shown in Fig. 3. Due to the rotation of the optical dispersing means it is not practicable to utilize a constituent line of the material to be analyzed for reference purposes. Accordingly, the reference employed for the ratio measurements preferably is a broad spectral region of the radiant energy from the source which is directed to a photosensitive element as described and claimed in U. S. Letters Patent No. 2,734,418 granted upon copending application Serial No. 156,763, filed April 19, 1950, by John H. Enns. Provision also may be made for eliminating errors in the ratio measurements which may arise because of wandering of the spark or arc over the surfaces of the electrodes by incorporating features set forth in copending application Serial No. 241,258, filed concurrently herewith by George C. Hill, Jr. Ratio measurements may be made by means of a ratio recorder, for example, of the type described and claimed in Williams Patent No. 2,522,976.

As shown in Figs. 1–3, the total radiation from a source 10 illustrated, for example, as an analytical gap 10, is directed through an entrance slit 11 (slit 46, Figs. 2 and 3) to a reflecting surface area 12a of a single concave spherical mirror 12. The radiation is collimated and reflected from the surface area 12a of mirror 12 to a spectral dispersing means 13 from which the radiation is redirected to a second reflecting surface area 12b of the mirror 12. The concave spherical surface area 12b redirects the radiant energy to form a spectrum in the plane of the exit slit 14 (slit 47, Figs. 2 and 3). The slit passes energy of a selected line to a suitable radiation receiver 15 which has been illustrated as a photomultiplier tube. A portion of the radiation from source 10 passing through entrance slit 11 (slit 46, Figs. 2 and 3) may be directed to a second photomultiplier tube 16 for a reference. As shown in Figs. 1–3, a transparent element 17 may be disposed within the path of radiant energy from entrance slit 11 (slit 46, Figs. 2 and 3), a major part passing through the element 17 directly to reflecting surface 12a and a small part being reflected so as to be received by the radiation receiver 16. It is to be understood that other suitable means for directing a part of the radiant energy to the radiation receiver 16 may be utilized, such as disclosed in the aforementioned copending applications of John H. Enns and George C. Hill, Jr. The output of radiation receiver 16 may be used as a reference for receiver 15 and preferably radiation receivers 15 and 16 are both connected to a ratio recorder 18 for the purpose of recording the relative intensity of the selected line with respect to the reference.

Figure 4:
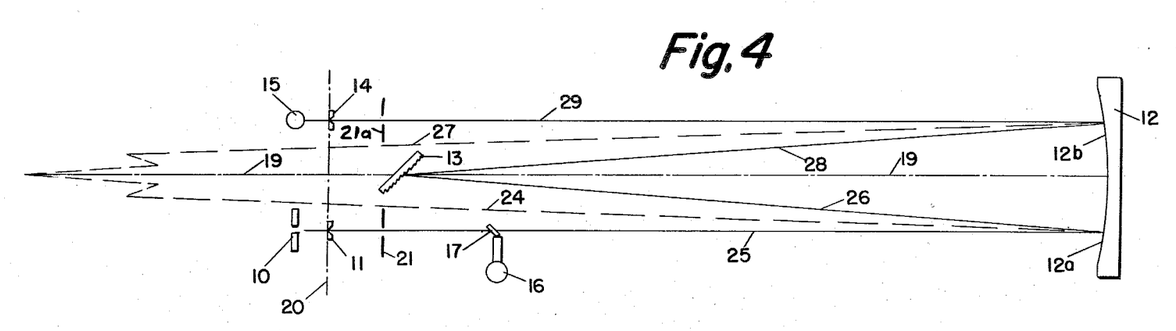
Fig. 4 is a ray diagram of the optical system shown in Figs. 1–3.

The relative positions of the various optical elements in the optical system of Figs. 1–3 may best be seen by reference to the ray diagram shown in Fig. 4. As may be seen, the single concave spherical mirror 12 provides a reflecting surface 12a to receive from entrance slit 11 radiation from source 10. The entrance slit 11 disposed to one side of the axis 19 of the mirror 12 directs a beam of radiant energy from source 10 to the area 12a. The energy is reflected from area 12a in parallel rays to dispersing means 13 of any suitable type, a plain reflection grating being illustrated. The grating 13, in face-to-face relationship with the concave mirror 12, is located along the axis 19 and has an angular position for directing dispersed radiant energy to a second reflecting surface 12b of the mirror. The concave spherical surface 12b redirects the radiant energy to produce sharply focused spectral lines in the plane of the exit slit 14 disposed on the opposite side of axis 19 in symmetrical relation with entrance slit 11, both slits being disposed in a common plane, the trace of which is indicated by line 20, Fig. 4, which plane is perpendicular to the axis 19.

Radiant energy passing through entrance slit 11, which is in the focal plane of the concave mirror 12, is converted by surface 12a into a beam of parallel rays directed upon the grating 13. Baffle structure 21 may be provided in the path of the entrance radiation to prevent undesirable radiant energy from passing to the mirror 12. Similarly, baffle structure 21a may be provided in the path of the exit radiation to prevent undesirable radiant energy from passing to the exit slit 14. If desired the baffle structures 21 and 21a each may comprise merely a single inner baffle member rather than the inner and outer members as illustrated in Fig. 4. The grating 13 spectrally disperses the radiant energy received thereby and redirects it to the concave spherical surface 12b which focuses the dispersed rays on the exit slit 14 which is also in the focal plane of the mirror 12. The slits 11 and 14 are equidistant from the mirror axis 19 which bisects the grating 13. By making the width of the exit slit 14 of a relatively small dimension, for example, of the order of five microns, only radiation in a narrow spectral region can pass through the slit.

While the entrance and exit slits 11 and 14 may be constructed parallel to each other and in a plane perpendicular to the plane of the paper on which Fig. 4 appears, in other modifications of the invention, curved entrance and exit slits 46 and 47 may be utilized as shown in Figs. 2 and 3 and as hereinafter will be explained more in detail. The curved slit structure modifications are claimed in divisional application Serial No. 446,106, filed July 27, 1954.

In the reflection of the radiant energy by the concave spherical surface 12a, unavoidable aberrations occur. Some aberrations also occur upon reflection of radiant energy from the surface of 12b. Advantage is taken of the fact that the aberrations incident to the reflection from the surfaces 12a and 12b are of equal magnitude and in opposite directions. Thus, the arrangement of the two reflecting surfaces of mirror 12 equidistant from the axis 19 provides a self-compensating system which reduces to a highly satisfactory minimum aberrations of radiant energy.

The symmetry of the system is such that a line 24 normal to the reflecting surface 12a bisects the angle between lines 25 and 26. The line 25 is representative of a radiant energy beam from the entrance slit 11, the latter being in the focal plane of concave mirror 12, and is collimated by surface 12a into parallel rays, one of which has been illustrated as line 26 which strikes the center of the grating 13. Similarly, line 27 bisects the angle between corresponding lines 28 and 29. The line 28 is representative of dispersed radiant energy directed by the grating 13 to surface 12b, the latter redirecting the dispersed radiant energy, represented as line 29, and focusing it on exit slit 14 which similarly to entrance slit 11 is located in the focal plane of the concave mirror 12. As both the entrance and exit slits are located in the focal plane of the mirror 12, the length of the optical system may be predetermined by selection of a suitable radius of curvature for the mirror 12. For example, in one application the focal length of the mirror was thirty inches and its polished concave surface was seven and one-half inches in diameter. The grating used in the system with this mirror had three inches of ruling (30,480 lines/inch) which were two and one-half inches long. The linear spectral dispersion in the focal plane was 5 A. U. per mm in the second order, thus the exit slit 14 of the foregoing example having a physical width in the order of five microns passes only radiation in the narrow region having a spectral width in the order of 0.025 angstrom.

Figure 6:
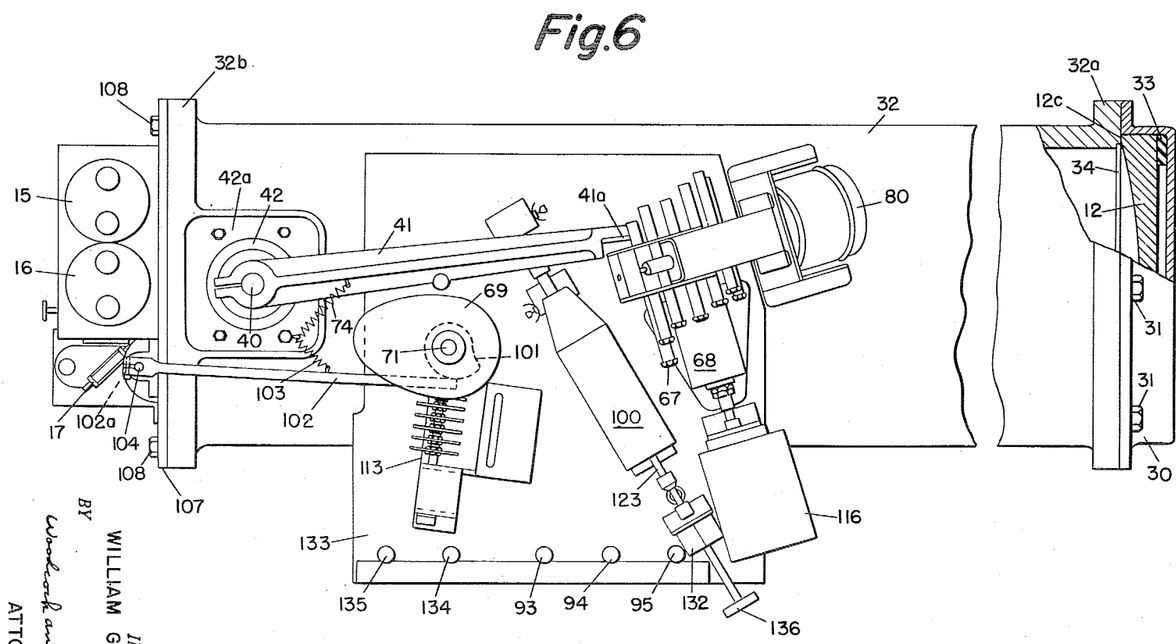
Fig. 6 is a plan view of a monochromator assembly of the type illustrated in Fig. 1.
Figure 7:
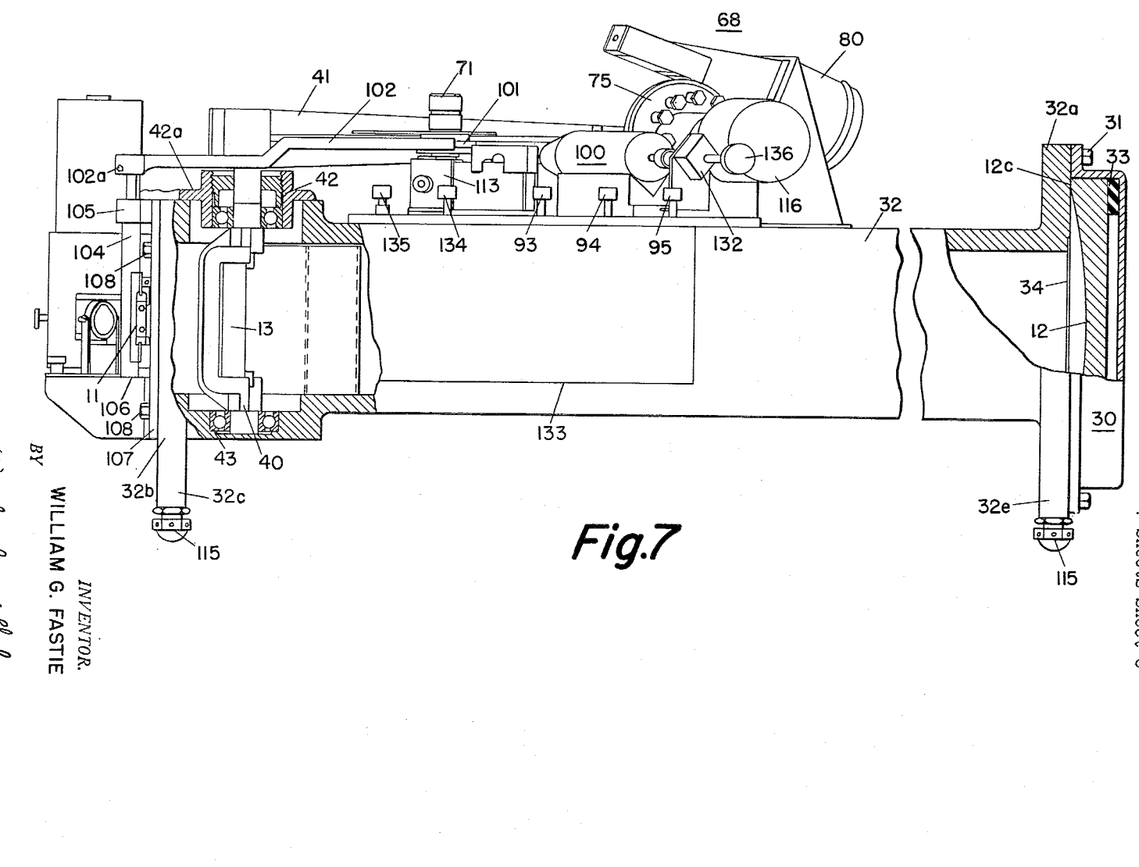
Fig. 7 is an elevation view of the monochromator assembly shown in Fig. 6.

Referring now to Figs. 6 and 7, the housing for the foregoing optical system may comprise an optical tube 32 of rugged construction, for example, a relatively thick wall casting having end flanges 32a and 32b of substantial thickness integral therewith. The outer faces of flanges 32a and 32b are finished in a manner such that the plane of each outer surface will be parallel to the other and both will be perpendicular to the longitudinal central axis of the tube or housing 32, which axis is to be coincident with the central axis of mirror 12. The mirror 12 is provided with a flat annular area 12c of uniform width surrounding the concave reflecting surface for abutting engagement with the finished outer surface of flange 32a of tube 32. The mirror 12 is adapted to be supported in position by a cup-shaped casting 30 which has an inner diameter slightly greater than the diameter of mirror 12. The casting 30 may be secured to flange 32a of tube 32 by a series of circumferentially disposed cap screws 31 with the central axis of the cup-shaped portion of casting 30 being coincident with the central axis of the tube 32. A rubber backing member 33 may be provided between the back of mirror 12 and the inner back wall of casting 30 to assure that the flat annular face 12c of the mirror will be firmly pressed against the finished end surface of flange 32a. Since the mirror 12 circumferentially closely fits the inner side wall of casting 30, and since the flat annular area 12c is of uniform width, the central axes of the cup-shaped portion of casting 30 and of mirror 12 supported therein will be coincident. Accordingly, when casting 30 is secured to flange 32a, in a manner as described above, the central axes of tube 32 and mirror 12 will be coincident. Thus, there is not only provided for mirror 12 a rugged solid mounting, but one which does not require adjustment. It is in adjustment upon assembly.

The opposite end of tube 32 is provided with a closure member 107 having corresponding apertures for the entrance and exit slits 11 and 14 hereinafter to be described more in detail. Closure member 107 may be secured to the finished surface of end flange 32b of tube 32 as by cap screws 108 and preferably the construction of member 107 is such that the slit structures will be accurately aligned on the opposite sides of the axis of the optical system when closure member 107 is secured in place. Accordingly, there is provided a simple rugged monochromator construction wherein the optical elements of the system will be properly positioned with respect to the optical axis of the system upon securing the closure members 30 and 107 to the corresponding end flanges of the optical tube 32.

Figure 11:
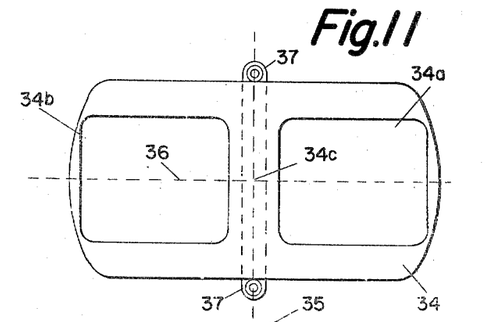
Fig. 11 is a view of the mirror mask for the monochromator illustrated in Figs. 6 and 7.

In order to reduce scattering of radiant energy within the tube 32 a mirror mask 34 may be provided so as to limit reflections from the mirror to areas 12a and 12b. The mask 34 is positioned in a counterbore in the finished surface of flange 32a, directly in front of mirror 12, Figs. 6 and 7. As shown in Fig. 11 the mirror mask 34 is provided with two identical openings 34a and 34b. The opening 34a serves to mark out the boundary of reflecting surface 12a and in like manner opening 34b marks out the boundary for reflecting surface 12b of mirror 12. The mask 34 is positioned with respect to tube 32 so that the central axis of tube 32 and the coincident axis of mirror 12 will intersect the central point 34c of mask 34, the central point 34c being defined by the intersection of the center lines 35 and 36 in Fig. 11. As may be seen the openings 34a and 34b are positioned equidistant from and on opposite sides of the vertical center line 35, and they are positioned centrally with respect to the horizontal center line 36 such that the corresponding halves of openings 34a and 34b extend above and below the line 36. The mask 34 may be secured against rotation in the counterbore by means of screws adapted to be inserted through openings 37 of mask 34.

Referring to Fig. 7, the tube 32 is provided with a plurality of supporting legs. End flange 32b is provided with a pair of extensions 32c to form two supporting legs and a third supporting leg of the tube is formed by the extension 32e of the other end flange 32a. The extensions 32c of end flange 32b are spaced apart one from the other and are in the same plane. Accordingly, only one extension 32c is visible in Fig. 7. The third supported leg formed by extension 32e is disposed centrally of the bottom edge of flange 32a. Adjustable leveling posts 115 may be provided for each of the three extensions as shown in Fig. 7.

The dispersing means or grating 13 of Figs. 1–3 and 7 is carried by a cross shaft 40 to which is secured the arm 41. The cross shaft 40 is journaled in bearing assemblies 42 and 43, the construction of which may clearly be seen in Fig. 7. The grating 13 may be rotated about the axis of cross shaft 40 by moving arm 41. There may be provided mechanism for continuous rotation of grating 13 throughout a predetermined angle to provide for scanning of various portions of the spectrum as shown in the system illustrated in Fig. 3, or there may be provided mechanism for step-by-step positioning of the grating 13 for selection of a desired spectral line or band as illustrated by the systems shown in Figs. 1 and 2. Also, the continuous drive mechanism, as well as the step-by-step mechanism for rotating the grating 13, may be combined in a single instrument, thereby permitting alternative use as disclosed in the monochromator assembly of Figs. 6 and 7. The foregoing drive mechanisms for the grating 13 will hereinafter be described more in detail.

Figure 5:
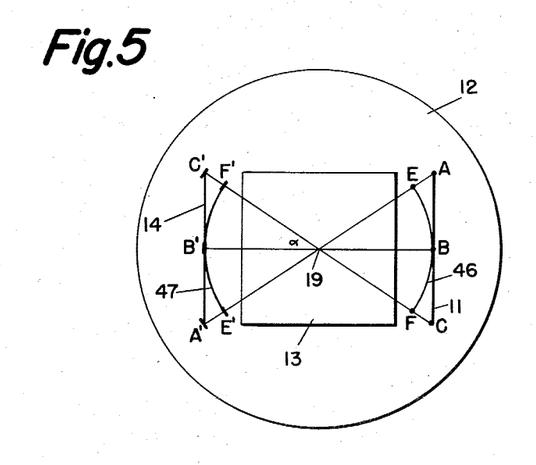
Fig. 5 is a diagrammatic end view of the improved optical system embodying the additional features of the curved entrance and exit slit structure of the present invention as shown in Figs. 2 and 3.

The curved slit structure illustrated in Figs. 1, 2, 3, 5 and 8–10 will now be described. Referring to Fig. 5 there is shown an end view of the improved optical system of the present invention wherein the mirror 12 is behind the plane of the paper, the grating 13 is facing the mirror 12 and is nearer the plane of the paper, the straight slits 11 and 14 and the curved slits 46 and 47 are in the plane of the paper, and the axis of the system is indicated at point 19. By reason of the symmetry of the optical system, as hereinbefore described in connection with Fig. 4, and because of the astigmatism of the system, a short line image of the point B on the entrance slit 11 is formed at B' on the exit slit 14. The line B' is perpendicular to the line B', 19, B. A line image of the point A at one end of entrance slit 11 is formed at A' perpendicular to the line A', 19, A, but not parallel to the exit slit 14. Similarly, a line image of point C at the opposite end of entrance slit 11 is formed at C' perpendicular to line C', 19C but not parallel to exit slit 14. Thus, it will be seen that with increasing the length of the straight entrance slit 11, the image formed at exit slit 14 will become less well defined. However, this deficiency of the system may be overcome with the provision of curved entrance and exit slits such as slits 46 and 47. If the slits 46 and 47 are circular arcs with their center of curvature at 19, then every point on the entrance slit is formed into a line image which is tangent to the exit slit at the focus. Thus, the image of the point E at entrance slit 46 is a line at E' which is tangent to the arc E'F' at exit slit 47, and point F at entrance slit 46 is a line at F' which likewise is tangent to the arc E'F' at exit slit 47, so that a sharp, well-defined image of entrance slit 46 will be formed at exit slit 47 regardless of the length of the slits. As may be seen in Fig. 5, the curved or arcuate slits 46 and 47 do not require any increase in diameter of the mirror 12.

For a given resolution the allowable width of the curved slits decreases with increasing length of slit according to the law:

$$(1) \qquad \frac{W'}{W} = \cos \alpha$$

where W' is the allowed slit width at F' and F, W is the slit width at B and B', and $\alpha$ is the angle between B', 19 and F', 19.

From the foregoing it will be seen that the slit opening should be crescent shaped because spectral dispersion is, at every point on the slit parallel to the center line of the slits, and a crescent shaped opening will have constant spectral width. Accordingly, the inner and outer jaw of the curve slit can be provided with the same radius of curvature and then be moved along their center lines in order to change the slit width thereby forming a crescent shaped opening. A suitable construction has been illustrated in Figs. 8–10.

Figure 8:
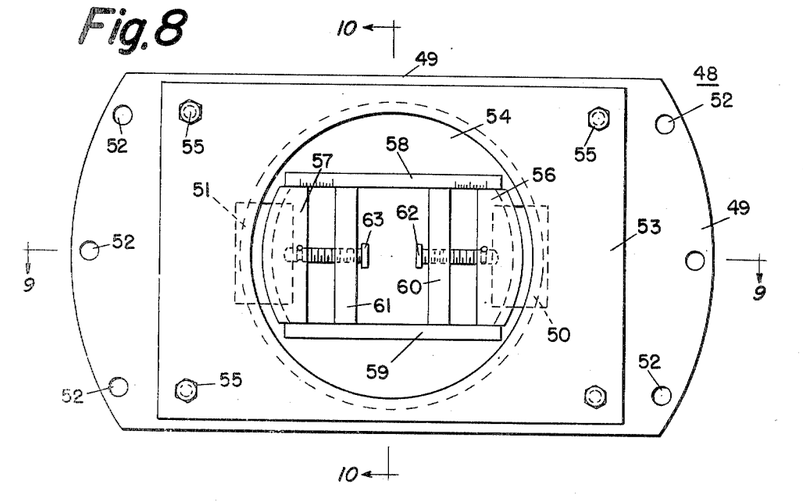
Fig. 8 is a view of an end plate for the monochromator assembly of Figs. 6 and 7, including curved entrance and exit slit structure.
Figure 9:
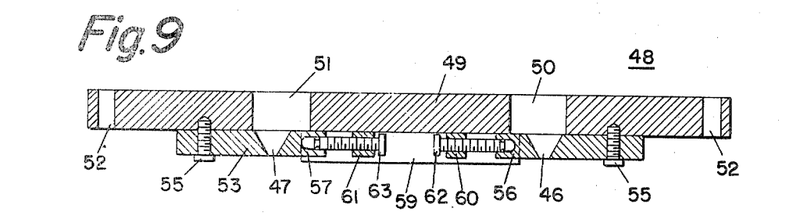
Fig. 9 is a view in cross-section taken along the lines 9—9 in Fig. 8.
Figure 10:
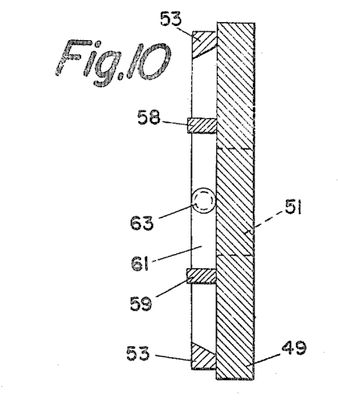
Fig. 10 is a view in cross-section taken along the lines 10—10 in Fig. 8.

In Figs. 8–10 there is shown an end plate assembly 48 provided with curved slit structure and which is adapted to be secured to the end flange 32b of tube 32 shown in Figs. 6 and 7. The end plate assembly 48 comprises an end plate 49 provided with a pair of openings 50 and 51. End plate 49 may be secured to flange 32b of tube 32 by any suitable means, for example, screws adapted to be inserted through openings 52 in end plate 49. To form the outer jaws of the entrance and exit slits 46 and 47 there is provided a plate 53 which has a beveled circular opening 54 extending therethrough. The plate 53 may be secured to end plate 49, for example, as by a plurality of screws 55. The inner jaws of the curved entrance and exit slits 46 and 47 are formed by means of members 56 and 57, each of which is provided with a curved beveled end, the radius of curvature of which is the same as the radius of curvature of the beveled circular opening 54 in plate 53. If entrance and exit slits of fixed width are to be used, the inner jaw members 56 and 57 may be positioned in the circular opening 54 and held against the end plate 49 adjacent the corresponding rectangular openings 50 and 51 in any suitable manner, for example, as by screws. The length of the openings 50 and 51 will determine the maximum length of slit which can be used.

It is also possible to provide for adjustment of the slit width. For this purpose there is provided a pair of ways 58 and 59 separated by cross members 60 and 61. The ways 58 and 59 are secured, as by welding, to the outer surface of end plate 49 in spaced parallel relation to each other and are adapted to receive slidably therebetween the inner jaw members 56 and 57 of the corresponding slits 46 and 47. The cross members 61 and 60 each are provided with a threaded opening for receiving threaded members 62 and 63, the corresponding ends of which are adapted to be received by the corresponding jaws 56 and 57 for movement of the latter between the ways 58 and 59. The foregoing arrangement provides for unilateral adjustment of the width of curved slits 46 and 47. As shown in Fig. 8, way 58 has been provided with a pair of scales which are adapted for accurately positioning the inner jaws 56 and 57. While separate adjusting means have been shown for each of jaws 56 and 57, it is to be understood that simultaneous adjustment of inner jaws 56 and 57 may be had by the provision of a suitable arrangement, for example, of the turnbuckle type. It is also to be understood that bilateral adjustment of the width of slits 46 and 47 may be provided. Instead of securing plate 53 to end plate 49 by means of screws 55, the end plate 53 may be cut in two and moved in ways in the end plate 49 in a manner similar to that described for the inner jaws 56 and 57 of the slits 46 and 47. Thus, the width of the curved slit openings 46 and 47 may be adjusted either unilaterally or bilaterally.

Referring now to Figs. 1, 2, 6 and 7, the position of the grating 13 for selection of the desired spectral band is determined by angular rotation of the grating arm 41 about the axis 40. The arm is biased to turn clockwise by a spring 74 and is accurately positioned by engagement of the spherical surface of ball bearing 41a held in the end of arm 41 with the plane end-surface of a stop member 67 of a position-determining assembly or turret 68. The ball 41a in arm 41 is illustrated in Fig. 2 in spaced relation with stop 67. This may be accomplished by a rotatable cam 69 engaging a cam follower 70 carried by arm 41, the cam 69 moving arm 41 to the extended position illustrated.

As shown in Figs. 1, 2, 6 and 7 the cam 69 is secured to the shaft 71 driven by a motor 72, Figs. 1 and 2. The motor 72 preferably is designed for constant speed rotation and drives cam 69 through a suitable reduction gearing (not shown) in a clockwise direction as viewed in Figs. 1, 2 and 6, cyclically to move arm 41 to the extended position illustrated in Fig. 2 and to permit its return as by a spring 74, Figs. 1, 2 and 6, until arrested by engagement of spherical surface 41a with the end of a stop, for example, stop member 67, positioned and locked into place with reference to a rotable support 75, Figs. 1, 6 and 7. Thus, as the surface of ball 41a engages stop 67, Figs. 1 and 6, the grating 13 predetermines the narrow region of the dispersed spectral energy which will pass through the exit slit 14 to the photomultiplier tube 15. The measurement of the intensity thereof in manner well understood by those skilled in the art will be initiated, as by the actuation of a switch under the control of a cam also secured to shaft 71.

Provision also may be made to permit scanning the selected lines or narrow bands of dispersed spectral energy by the photomultiplier tube 15 as hereinafter will be described more in detail. Briefly, during the measuring period a cam 101 shown in Figs. 1 and 6 drives arm 102 so as to rotate the entrance slit 11 through a minute arc. This movement results in a shift in the spectrum focused in the plane of the exit slit 14 by an amount sufficient to insure measurement of the peak intensity of the spectral line selected by stop 67. After the measurement has been completed the arm 102 drops off the high point of cam 101 and is thereby repositioned preparatory to the initiation of the next measuring operation.

To initiate the measurement of another spectral line another cam 79 also carried by shaft 71, Figs. 1 and 2, moves the contacts of switch 78 from an open position, Fig. 1, to a circuit-closing position, Fig. 2, since the cam follower of switch 78 will engage the crest 79a of the cam 79. This switching operation, which may involve a plurality of circuit-controlling contacts, is utilized to establish an energizing circuit for the actuator 80 of the line-selecting mechanism. The actuator 80 may be of any suitable type, for example, a stepping relay or a motor having control circuits as described and claimed in the copending application Serial No. 241,172 filed concurrently herewith by Norman E. Polster.

While the foregoing discussion has dealt with the mechanism for step-by-step positioning of the grating 13, the continuous drive mechanism for grating 13 illustrated in Figs. 3, 6 and 7 will now be described. For some applications it is desirable to scan a wide spectral region rather than to select specific lines or narrow bands therefrom for which the step-by-step mechanism is designed and it is for these applications that the continuous drive mechanism is applicable. As shown in Figs. 3, 6 and 7, provision has been made for continuous scanning of the spectrum and for scanning the spectrum at multiple speeds. For example, in some applications it may be necessary to scan the spectrum at relatively low speeds, for example, in the order of one or less Angstrom per minute. For other applications it may be necessary to scan at a slightly higher speed, for example, in the order of 30 Angstroms per minute and in other applications, it may be necessary to scan at a relatively high rate of speed, for example, in the order of 1780 Angstroms per minute.

Accordingly, there is schematically shown in Fig. 3 mechanism for continuously scanning the entire spectrum and for scanning the spectrum at multiple speeds. As in the case of Figs. 1 and 2, the grating 13 is rotated about the axis of its supporting cross shaft 40 by moving the lever arm 41 secured at one end of cross shaft 40. The means for moving lever arm 41 is as follows: There is provided a reversible motor 81 which is energized from lines $L_1$, $L_2$, the motor preferably being designed for constant speed rotation for driving a connecting shaft 82 and a plurality of gears 83—85 secured thereto at a uniform speed. A second shaft 86 is disposed parallel to shaft 82 and is provided with a plurality of gears 87—89 which normally are freely rotatable on shaft 86 and which are disposed for engagement with corresponding gears 83—85. Thus, when motor 81 is energized, shaft 82 will be rotated as will gears 83—85 carried thereby and gears 87—89, the latter gears being driven by gears 83—85. Since gears 87—89 are freely rotatable on shaft 86 there will be no rotation of shaft 86 at this time.

Secured to shaft 86 are a plurality of clutch plates or discs 90—92 which are adapted to be moved into frictional engagement with the corresponding gears 87—89 by means of suitable levers 93—95. Upon actuation of one of the levers 93—95, the corresponding clutch plate 90—92 will be moved into frictional engagement with the corresponding gear 87—89, thereby locking the gear 87—89 to the shaft 86 for rotation of the latter. As may be seen in Fig. 3, each of gears 83—85 is progressively larger in diameter, whereas each of gears 87—89 is progressively smaller in diameter. Accordingly, when lever 93 is actuated to secure gear 87 to shaft 86, the shaft 86 will rotate at a relatively slow speed. When lever 95 is actuated to secure gear 89 to shaft 86, the shaft 86 will be rotated at a relatively high speed. Similarly, when lever 94 is actuated to secure gear 88 to shaft 86, shaft 86 will be driven at an intermediate speed.

For rotating the grating 13 in reverse directions about its supporting cross shaft 40, there is provided a drive screw mechanism 100 which is connected to shaft 86 by a suitable gear train which has been illustrated as a plurality of beveled gears 97a—97d. The drive screw mechanism 100 comprises a housing 120 which is provided with ball races 121, 122 for rotatably carrying drive member 123, the latter being provided with a shaft which is connected directly to beveled gear 97d. The drive member 123 is provided with an internally threaded portion 123a for receiving the threaded end 125a of driven member 125. As shown in Fig. 3, the opposite end 125b of driven member 125 is adapted to bear against a second ball surface similar to 41a in arm 41, the arm 41 being biased in position by means of spring 74. The driven member 125 is provided with a keyway 126 and is keyed to the housing 120 as by key 127 to prevent rotation of driven member 125. Upon rotation of drive member 123 through gear train 97a—97d and shaft 86, the threaded end 125a of driven member 125 will be caused to advance longitudinally with respect to the housing 120; however, the driven member 125 will not be rotated since it is keyed to the housing 120 by means of key 127. Upon movement of driven member 125, the slot 126 will move longitudinally with respect to the key 127.

Provision also is made for reversing the direction of movement of driven member 125. Reversing switch 118 having contacts 118a and 118b is provided in the control circuit of motor 81. With the reversing switch 118 in a position for completing a circuit through contact 118a, the driven member 125 will advance in a forward direction until pin 128 carried thereby engages the actuating lever 129a of a limit switch 129 which breaks the circuit of motor 81 and prevents further movement of driven member 125 in a forward direction. To reverse the direction of movement of driven member 125, reversing switch 118 is moved to close the circuit of motor 81 through contact 118b thus causing driven member 125 to reverse its direction of movement and travel toward the limit switch 130. Upon engagement of pin 128 with the actuating member 130a of limit switch 130, the circuit of motor 81 again will be broken thereby preventing further advancement of driven member 125 in a direction toward limit switch 130. This reciprocable movement of driven member 125 will cause arm 41 to be rotated first in a counter-clockwise direction and then in a clockwise direction, which in turn rotates grating 13 about the axis of its cross shaft 40 in corresponding directions. Accordingly, the rotation of grating 13 first in one direction and then in the other direction will cause an image of the spectrum to be moved across the exit slit 47 of the monochromator system, thereby permitting the spectrum to be scanned first in one direction and then in a reverse direction during which time measurements of the peak intensities of the various lines of the spectrum may be measured and recorded, or selected spectral lines or the substantially monochromatic radiant energy of a narrow band of wavelengths may be isolated for other applications wherein such procedure is desirable. The length of time for scanning the spectrum will be determined by selection of the gear ratios as previously described. It is also to be noted that with the motor 81 deenergized and the clutches released, the screw 125 may be positioned manually by rotating knob 136, Fig. 6.

In spectrometers utilizing the continuous drive mechanisms for rotating the grating 13, the image of the spectrum produced by grating 13 is passed over the exit slit, thereby permitting the scanning of the various lines making up the spectrum. As has already been mentioned, provision also is made for scanning the various lines of the spectrum when line selection is provided by the step positioned turret stops of mechanism 68. Referring to Figs. 1, 6 and 7, it will be seen that continued rotation of shaft 71 produces by means of a cam 101 and a cam follower arm 102, to which spring 103, Fig. 6, is shown connected, rotation of follower 102 about a pivotal support 104. The arm 102 is secured by a clamp 102a to entrance slit structure 11, Figs. 1 and 7, which by reason of movement of arm 102 toward and away from the center of shaft 71, rotates the entrance slit 11 through a predetermined angle. Rotation of the entrance slit 11 through a small angle causes the image of the spectrum formed in the plane of the exit slit 14 to be moved substantially laterally with respect thereto. By setting the stop pin of the turret so that the image of the desired line is centered on the exit slit when the entrance slit is centered, passage of the desired line through the exit slit at some instant during shifting of the spectrum is insured in spite of slight changes in the optical system due to temperature or the like. In this manner the selected line or band of the dispersed radiant energy may be scanned during the measurement operation and the intensity peak thus measured and recorded.

As shown in Figs. 1 and 7, the structure of entrance slit 11 is supported on a post 104 to the upper end of which the arm 102 is secured as has already been described. The pivotal member or post 104 is journaled in bearing supports 105 and 106 carried by the closure plate 107 secured to the flange 32b of tube 32. Closure member 107 may be similar to end plate 49 previously described in connection with Fig. 8 and, of course, is provided with suitable apertures for passage of light through the entrance slit and out of the exit slit. Reference to Fig. 1 will make self-evident the effect of rotating the slit structure 11 in changing the direction of the beam 25 upon reflecting surface 12a and upon the dispersed radiant energy 29 which passes through the exit slit 14. The extent of rotation of the entrance slit 11 is only of the order of a minute of arc which in the aforesaid example produced a lateral shift of the focused spectrum with respect to exit slit 14 in the order of 0.2 angstrom. Since the movement is of such a low order, the slit 11, for all practical purposes, can be considered as moving in the plane indicated at 20 in Fig. 4.

After the foregoing scanning operation has taken place, arm 102 is returned to its retracted position, the cam 69 again moves arm 41 outwardly away from the stop 67 and cam 79 again closes the contacts of switch 78 for the operation of actuator 80. The actuator 80 thereupon rotates the position-determining or line-selecting assembly 68 to bring another stop, as for example, stop 111, into registry with the surface 41a of arm 41. There may be many stops carried by the rotatable member 75 of mechanism 68, though in Fig. 1 only two have been shown in full length, the remainder being shown as broken away for the sake of simplicity of drawing and explanation.

Referring to Figs. 6 and 7 there is shown a commercial embodiment of a monochromator useful in a direct recording spectrochemical analyzer as described above. It will be noted that transparent element 17 has been positioned externally of entrance slit 11 rather than between entrance slit 11 and the mirror 12 as illustrated in Figs. 1–3. Likewise the reference photomultiplier tube 16 and its associated housing are disposed externally of entrance slit 11 and adjacent element 17 for receiving radiation redirected therefrom. The double-ended grating mounting 40 has a structural advantage in that it has a long effective bearing surface thereby giving assurance that the grating will be rotated about a fixed axis. The axis of rotation of the grating may be precisely positioned since the top bearing assembly 42 is positioned in an oversize hole thereby permitting adjustment of the crank shaft 40 so that the axis of rotation of the grating 13 is perpendicular to the axis of the spherical mirror 12 and so that the ruled lines on the grating are perpendicular to the plane which passes through the midpoint to the entrance and exit slits, this plane containing the optical axis of spherical mirror 12. It will be noted that the top bearing mounting 42 extends outside of the upper surface of the optical tube 32 thereby providing for ease in adjustment of the axis of rotation of the grating. The bearing assembly 42 may be secured to the optical tube 32 as by cap screws fitted through oversize holes in the housing member 42a of the top bearing assembly 42. As may be seen, both the mechanism for step-by-step positioning of the grating and for continuous scanning of the spectrum have been combined in a single instrument. In connection with the continuous scanning operation, the drive screw mechanism 100 has been provided with a suitable counter 132 which is driven from a shaft directly connected to the drive member 123. The counter 132 may be calibrated in terms of wavelength so as to indicate the corresponding spectral lines as they pass over the exit slit of the monochromator. The drive screw mechanism 100 has been mounted in a position such that the angle between the grating arm 41 and the axis of drive screw mechanism 100 will produce a linear relation between the counter reading and wavelength.

The gear mechanism schematically illustrated in Fig. 3 has been placed within the housing 133 and levers 93—95 have been indicated as by push buttons having corresponding reference characters. Since both motor 72, Figs. 1 and 2, and motor 81, Fig. 3, are constant speed motors and are utilized for scanning operations, a single motor may be substituted therefor in Figs. 6 and 7 for driving shaft 71 and drive screw mechanism 100. The selector switching assembly 113 is adapted to be actuated from shaft 71 driven by the scanning motor, and the selector switching assembly 116 is associated with the actuator or turret motor 80. The selector switching assemblies 113 and 116 are useful for controlling the operation of the monochromator system as a whole. Preferably the control system for the complete spectrometer system may be of the type more fully disclosed in U. S. Letters Patent No. 2,735,330 granted upon copending application Serial No. 241,172, filed concurrently herewith by Norman E. Polster and in application Serial No. 536,885 filed September 27, 1955 which is a division thereof. Briefly, when step-by-step operation is to be utilized for selecting various lines of the spectrum, push button 134 may be depressed thereby connecting shaft 71 with the continuously driven motor contained within housing 133. Another push button 135 is provided for actuating a suitable mechanical interlocking mechanism contained within the housing 133 whereby upon depressing button 135 the continuous motor within housing 133 will be disconnected with respect to both shaft 71 and drive screw mechanism 100. Accordingly, with both of the driving mechanisms for the grating 13 being disconnected therefrom, manual adjustment of the grating may be accomplished by means of hand wheel 136, the latter being useful in connection with setting the various stops of turret 68 in predetermined positions preparatory to initiating a measuring operation. The mechanical interlock for push buttons 93—95 and 134—135 is such that when any one of the foregoing buttons is depressed all of the other buttons are moved to a released position.

The optical system of the present invention is also suitable for forming a precise optical image comprising undispersed radiation. For example, in Figs. 2 and 3 the grating 13 may be replaced by a plane mirror with the reflecting surface thereof perpendicular to the central axis of mirror 12 and parallel to curved slits 46 and 47. With the optical elements in this relation there will be formed at exit slit 47 a precise sharply defined image of entrance slit 46 comprising total radiation rather than a selected spectral line as in the case of the aforementioned systems.

One of the advantages of the present invention is that the mechanism for cylically imparting a scanning movement to the entrance slit in fixed time sequence with movement of grating 13 as illustrated in Fig. 1, is assured through the provision of a scanning system wherein the entrance slit structure and the rotatable grating are mechanically tied together, the rotation of both structures being derived from cam means driven from the same rotatable shaft. Thus the difficulties encountered in providing synchronization of movement of the foregoing structures has been reduced to a minimum. Scanning arrangements generically similar to those disclosed herein are claimed in copending application Serial No. 241,188 filed August 10, 1951 by Raymond C. Machler.

While a preferred embodiment of this invention has been illustrated, it is to be understood that the invention is not limited to the specific arrangements shown and that further modifications may be made without departing from the spirit and scope of the invention as set forth in the appended claims.

What is claimed is:

1. In a spectrochemical analysis system for determining the peak intensity of a predetermined spectral emission line, the combination comprising a pivotally mounted dispersing element and a reflecting element disposed in face-to-face relation, pivotally mounted structure defining an aperture for projection therethrough of radiant energy upon one of said elements, structure defining an aperture for receiving dispersed reflected radiant energy from the other of said elements, adjustable stop means for positioning said dispersing element at predetermined angular positions with respect to said reflecting means for predetermining the spectral emission line to be imaged on said last-named aperture, and means for rotating said first-named aperture with a scanning movement to move said predetermined spectral line across said last-named aperture for determination of the peak intensity thereof, said last-named means being adapted cyclically to move said dispersing element to another angular position after each said scanning movement.

2. In a spectrochemical analysis system for determining the peak intensity of each predetermined spectral emission line, the combination comprising a tubular housing, a spherical concave mirror forming a closure for one end of said housing, the central axis of said mirror being coincident with the axis of said housing, a closure member for the other end of said housing, said closure member having structures defining entrance and exit slits spaced equidistant from the axis of said housing, means for pivotally mounting said entrance slit structure, a reflection grating disposed within said housing in face-to-face relation with said mirror, said grating being pivotally mounted for rotation about an axis perpendicular to said coincident axes of said mirror and said housing and to a plane passing through said grating and the midpoints of said entrance and exit slits, adjustable stop means for positioning said grating at predetermined angular positions about the axis of rotation of said grating for projecting images of predetermined spectral lines upon said exit slit, an arm carried by said grating, means for biasing said arm against said stop means, an arm carried by said entrance slit structure for pivoting said entrance slit about the axis thereof, a rotatable shaft carrying a plurality of cams, one of said cams being adapted for engagement with said arm carried by said grating for cyclically moving said arm out of engagement with said stop means during each revolution of said shaft thereby permitting movement of said stop means to another predetermined position corresponding with another spectral line, and another of said cams being adapted for engagement with said arm carried by said entrance slit structure for imparting a scanning movement to said structure defining said entrance slit to move the corresponding predetermined spectral line image across said exit slit for determination of the peak intensity thereof while said grating arm is in engagement with said stop means and prior to movement of the latter to another line-selecting position.

3. In a spectrochemical analysis system in which measurement of the peak intensity of each selected spectral emission line is insured, the combination comprising a monochromator having entrance slit and exit slit structure, means for producing a spectrum focussed at said exit slit structure, automatically movable means associated with said spectrum producing means for moving a selected spectral emission line in the focused spectrum into at least approximate alignment with said exit slit, means associated with one of said slit structure and producing minute lateral motion thereof to produce relative motion of the selected line in the focused spectrum with respect to said exit slit and insure passage of the peak intensity of radiant energy of the selected spectral emission line through said exit slit, drive means having a common connection between said movable means and said means producing minute lateral motion of said one of said slit structures automatically to produce a scanning motion of said one of said slit structures during periods when said movable means associated with said spectrum producing means is at rest, a measuring circuit including radiant energy sensitive means for receiving the radiant energy passing through said exit slit to produce a signal of varying magnitude whose maximum is representative of the peak intensity of the selected spectral emission line unaffected by intensities of adjacent portions of the spectrum, and indicating means continuously connected to said sensitive means during said scanning motion to provide an indication of the peak intensity of the selected spectral emission line.

4. In a spectrochemical analysis system in which measurement of the peak intensity of each selected spectral emission line is insured, the combination comprising a monochromator having entrance slit and exit slit structure, means for producing a spectrum focused at said exit slit structure, automatically movable means associated with said spectrum producing means for moving a selected spectral emission line in the focused spectrum into at least approximate alignment with said exit slit, means associated with said entrance slit and producing minute lateral motion thereof to produce relative motion of the selected line in the focused spectrum with respect to said exit slit and insure passage of the peak intensity of radiant energy of the selected spectral emission line through said exit slit, drive means having a common connection between said movable means and said means associated with said entrance slit automatically to produce a scanning motion of said entrance slit during periods when said movable means associated with said spectrum producing means is at rest, a measuring circuit including radiant energy sensitive means for receiving the radiant energy passing through said exit slit to produce a signal of varying magnitude whose maximum is representative of the peak intensity of the selected spectral emission line unaffected by intensities of adjacent portions of the spectrum, and indicating means continuously connected to said sensitive means during said scanning motion to provide an indication of the peak intensity of the selected spectral emission line.

5. In a spectrochemical analysis system in which measurement of the peak intensity of a spectral emission line is insured, the combination comprising a monochromator having entrance slit and exit slit structure and movable means associated with a dispersing element cooperating with other optical elements to produce a spectrum focused at said exit slit, structure associated with one of said slit structures for producing minute lateral motion thereof to produce relative motion of the focused spectrum with respect to said exit slit and insure passage of the peak intensity of radiant energy of the selected spectral emission line through said exit slit, drive means having a common connection between said movable means associated with said dispersing element and said means producing a minute lateral motion of said one of said slit structures automatically to produce a scanning motion of said one of said slit structures during periods when said movable means associated with said dispersing element is at rest, a measuring circuit including radiant energy sensitive means for receiving the radiant energy passing through said exit slit to produce a signal of varying magnitude whose maximum is a function of the peak intensity of the selected spectral emission line unaffected by intensities of adjacent portions of the spectrum, and indicating means continuously connected to said sensitive means during said scanning motion to provide an indication of the peak intensity of the selected spectral emission line.

6. In a spectrochemical analysis system in which measurement of the peak intensity of a spectral emission line is insured, the combination comprising a monochromator having entrance slit and exit slit structure and movable means associated with a dispersing element cooperating with other optical elements to produce a spectrum focused at said exit slit, structure associated with said entrance slit for producing minute lateral motion thereof to produce relative motion of the focused spectrum with respect to said exit slit and insure passage of the peak intensity of radiant energy of the selected spectral emission line through said exit slit, drive means having a common connection between said movable means associated with said dispersing element and said means producing a minute lateral motion of said entrance slit automatically to produce a scanning motion of said entrance slit during periods when said movable means associated with said dispersing element is at rest, a measuring circuit including radiant energy sensitive means for receiving the radiant energy passing through said exit slit to produce a signal of varying magnitude whose maximum is a function of the peak intensity of the selected spectral emission line unaffected by intensities of adjacent portions of the spectrum, and indicating means continuously connected to said sensitive means during said scanning motion to provide an indication of the peak intensity of the selected spectral emission line.

7. In a spectrochemical analysis system for determining the peak intensity of each selected spectral emission line, the combination comprising a tubular housing having a flat end wall thereof perpendicular to the longitudinal axis of said housing, a concave spherical mirror having a flat annular periphery concentric with the axis of said mirror and in a plane perpendicular to the axis of said mirror, means for retaining said annular periphery of said mirror in engagement with the flat end wall of said housing with the axis of said mirror coincident with the axis of said housing to form a closure for one end of said housing, a closure member for the other end of said housing, said closure member having structure defining entrance and exit slits spaced equidistant from the axis of said housing, movable dispersing means disposed within said housing and cooperating with said mirror to produce a spectrum focused at said exit slit, means associated with one of said slits for producing minute lateral motion thereof to produce relative motion of the focused spectrum with respect to said exit slit, and drive means having a common connection between said movable dispersing means and said means producing a minute lateral motion of said one of said slits automatically to produce a scanning motion of said last named slit during periods when said movable dispersing means is at rest.

8. In a spectrochemical analysis system for determining the peak intensity of each selected spectral emission line, the combination comprising a tubular housing having an end flange extending perpendicular to the axis of said housing, a cup-shaped closure member for one end of said housing having an end flange perpendicular to the axis of said member, means for securing said end flange of said member to said end flange of said housing with the axes of said housing and said member coincident, a concave spherical mirror having a diameter slightly less than the inner diameter of said member, said mirror being adapted to being disposed within the cavity of said closure member, said mirror having a flat annular area of uniform width surrounding the concave surface thereof for engagement with said end flange of said housing automatically to align the central axis of said mirror with the axis of said housing, a closure member for the other end of said housing having structure defining entrance and exit slits spaced equidistant from the axis of said housing, a pivotally mounted dispersing element disposed in said housing and facing said mirror to produce a spectrum focused at said exit slit, means associated with one of said slits for producing a minute lateral motion thereof to produce relative motion of the focused spectrum with respect to said exit slit, adjustable stop means for positioning said dispersing element at predetermined angular positions with respect to said mirror for selecting the spectral emission line to be focused at said exit slit, and drive means having a common connection between said pivotally mounted dispersing element and said means producing a minute lateral motion of said one of said slits automatically to produce a scanning motion of said last named slit during periods when said dispersing element is at rest, said drive means being adapted cyclically to move said dispersing element to another angular position after said scanning motion for determining the peak intensity of another selected spectral line.

References Cited in the file of this patent
UNITED STATES PATENTS

| | | |
|---|---|---|
| 1,552,451 | Roach | Sept. 8, 1925 |
| 1,943,898 | Müller | Jan. 16, 1934 |
| 2,021,232 | Fassin | Nov. 19, 1934 |
| 2,078,768 | Meier | Apr. 27, 1937 |
| 2,166,824 | Runaldue | July 18, 1939 |
| 2,179,850 | Glancy | Nov. 14, 1939 |
| 2,236,379 | Pineo | Mar. 25, 1941 |
| 2,258,903 | Mitchell | Oct. 14, 1941 |
| 2,339,053 | Coleman | Jan. 11, 1944 |
| 2,350,151 | Dahl | May 30, 1944 |
| 2,351,457 | Rust et al. | June 13, 1944 |
| 2,408,512 | Gradisar | Oct. 1, 1946 |
| 2,411,741 | Michaelson | Nov. 26, 1946 |
| 2,430,551 | Arnold et al. | Nov. 11, 1947 |
| 2,462,946 | Coggeshall et al. | Mar. 1, 1949 |
| 2,478,762 | Johnson | Aug. 9, 1949 |
| 2,483,746 | White | Oct. 4, 1949 |
| 2,487,875 | Hutchison | Nov. 15, 1949 |
| 2,499,322 | Mather et al. | Feb. 28, 1950 |
| 2,517,121 | Liston | Aug. 1, 1950 |
| 2,579,225 | Borst et al. | Dec. 18, 1951 |
| 2,594,334 | Miller | Apr. 29, 1952 |
| 2,602,368 | Barnes | July 8, 1952 |
| 2,605,671 | Canada | Aug. 5, 1952 |
| 2,638,811 | Williams | May 19, 1953 |

OTHER REFERENCES

J. O. S. A., vol. 31, 1941, pages 682–689, article by Cary et al.